(12) United States Patent
Thornberry

(10) Patent No.: US 8,855,466 B2
(45) Date of Patent: Oct. 7, 2014

(54) SEPARATE VIDEO FILE FOR I-FRAME AND NON-I-FRAME DATA TO IMPROVE DISK PERFORMANCE IN TRICK PLAY

(75) Inventor: Kevin Thornberry, Leeds (GB)

(73) Assignee: Eldon Technology Limited, Steeton (GB)

( * ) Notice: Subject to any disclaimer, the term of this patent is extended or adjusted under 35 U.S.C. 154(b) by 0 days.

(21) Appl. No.: 13/461,567

(22) Filed: May 1, 2012

(65) Prior Publication Data

US 2013/0294743 A1    Nov. 7, 2013

(51) Int. Cl.
*H04N 9/80* (2006.01)
*H04N 5/92* (2006.01)

(52) U.S. Cl.
USPC .......................................... 386/239

(58) Field of Classification Search
USPC .......................................... 386/329
See application file for complete search history.

(56) References Cited

U.S. PATENT DOCUMENTS

| | | | |
|---|---|---|---|
| 5,577,191 A | 11/1996 | Bonomi | |
| 5,852,706 A * | 12/1998 | Ogikubo et al. | 386/329 |
| 5,949,948 A * | 9/1999 | Krause et al. | 386/350 |
| 6,148,031 A | 11/2000 | Kato | |
| 6,728,471 B1 * | 4/2004 | Kaku | 386/343 |
| 2003/0077073 A1 * | 4/2003 | Lin et al. | 386/68 |
| 2005/0097614 A1 * | 5/2005 | Pedlow et al. | 725/90 |
| 2011/0058792 A1 | 3/2011 | Towner et al. | |
| 2012/0237189 A1 * | 9/2012 | Welzen et al. | 386/343 |

FOREIGN PATENT DOCUMENTS

EP    1058265 A1    12/2000

OTHER PUBLICATIONS

European Search Report, dated Sep. 27, 2013, for Application No. 13165865.0, 3 pages.

* cited by examiner

*Primary Examiner* — Thai Tran
*Assistant Examiner* — Nien-Ru Yang
(74) *Attorney, Agent, or Firm* — Seed IP Law Group PLLC

(57) ABSTRACT

A device has an input circuit to receive a stream of video data, which includes intra-frames (I-frames) and inter-frames. A video frame parser separates the I-frames and inter-frames from the stream of video data. A memory device has a file system thereon, and a processor is configured to process the video data. The processor stores the I-frames in an I-frame file in a contiguous memory region of the memory device and stores the inter-frames in an inter-frame file of the memory device. The processor also stores an index file, which includes information to coordinate a pre-parsed position of each I-frame with at least one adjacent inter-frame.

23 Claims, 6 Drawing Sheets

SEPARATE VIDEO FILE FOR I-FRAME AND NON-I-FRAME DATA TO IMPROVE DISK PERFORMANCE IN TRICK PLAY

BACKGROUND

1. Technical Field

The present disclosure generally relates to improving performance of an entertainment device during trick modes and more particularly, but not exclusively, relates to efficiently using a storage medium to play video forward and reverse at a faster than normal speed.

2. Description of the Related Art

Entertainment systems are used to present audio and video information to users. For example, satellite and cable television systems present programming content to users through presentation systems such as televisions and stereos. The programming content may include sporting events, news events, television shows, or other information. The programming content generally includes audio information, video information, and control information which coordinates the presentation of the audio and video data.

In many cases, the programming content is encoded according to an accepted multimedia encoding standard. For example, the programming content may conform to an ISO/IEC MPEG-2 standard, an ISO/IEC MPEG-4 standard, an ITU-T H.264 standard, or some other standard.

In many cases, the accepted multimedia encoding standard will encode the video data as a sequence of constituent frames. The constituent frames are used independently or in combination to generate presentable video frames which can be sent in sequence to a presentation device such as a display. The video data may, for example, be encoded as a video data stream of I-frames, P-frames, and B-frames according to a multimedia standard protocol.

An I-frame, or intra-frame, is a frame of video data encoded without reference to any other frame. A video data stream will typically begin with an I-frame. Subsequent I-frames will be included in the video data stream at regular or irregular intervals. I-frames typically provide identifiable points for specific access into the video data stream. For example, when a user is seeking to find a particular point in a multimedia file, a decoder may access and decode I-frames in a video data stream in either a fast-forward or reverse playback mode. An advantage of I-frames is that they include enough information to generate a complete frame of presentable data that can be sent to a display device. A disadvantage of I-frames is that they are relatively large compared to other frames.

A P-frame, or predictive inter-frame, is encoded with reference to a previous I-frame or a previous P-frame. Generally speaking, a P-frame does not include enough information to generate the static elements of a presentable frame that have not changed from previous frames. Instead, the P-frame merely references a particular previous frame and uses the video information found in the previous frame. Stated differently, the areas of a presentable frame that have not changed are propagated from a previous frame, and only the areas of a presentable frame that have changed (i.e., the areas that are in motion) are updated in the current frame. Thus, only the areas of the presentable frame that are in motion are encoded in the P-frame. Accordingly, P-frames are generally much smaller in size than I-frames.

A B-frame, or bi-directionally predictive inter-frame, is encoded with reference to one or more preceding reference frames as well as one or more future reference frames. B-frames improve the quality of multimedia content by smoothly tying video frames of moving video data together. A B-frame is typically very small in size relative to I-frames and P-frames. On the other hand, a B-frame typically requires more memory, time, and processing capability to decode.

In an example, programming content is encoded as a stream of video data according an MPEG-2 or MPEG-4 multimedia standard. In the stream of video data, one of every ten to thirty frames may be an I-frame. If the video information is presented at a rate of 30 frames-per-second (30 fps), then each second of presentable data may include only two or three I-frames or fewer. The remaining 27 or 28 frames per second of presentable data are formed by decoding the P-frames and B-frames.

During trick play modes (e.g., fast-forward, reverse, and the like), the constituent frames are retrieved and decoded into presentable frames, and the presentable frames are output to a presentation device. In order to perform a trick play mode, the entertainment device must be able to quickly retrieve and decode the constituent frames. When played at faster speeds, the entertainment device will often retrieve and decode only the I-frames because in conventional systems, there are insufficient computing resources to retrieve and decode every frame in the stream.

BRIEF SUMMARY

During high-speed forward or reverse trick play of an MPEG video stream, an entertainment device embodiment will decode and display only the I-frames because decoding the non-I-frames at high speed is computationally intensive.

Embodiments to improve performance during trick display modes create separate video files for I-frames and non-I-frames. When a video data stream is processed (e.g. decoded), the stream is split and stored into two separate files. A first file sequentially contains the I-frame data and a second file contains the non-I-frame data. A third file, an index file, is also created. The index file contains information to splice I-frame data from the first file and non-I-frame data from the second file back together to reconstruct the video data stream.

In one embodiment, a method to play a video data stream includes parsing the video data stream to extract constituent intra-frames (I-frames) and inter-frames; storing a sequence of I-frames in an I-frame file, each I-frame of the sequence including information to generate a corresponding presentable video frame; and storing a set of inter-frames in an inter-frame file, each inter-frame of the set including a reference to at least one I-frame and information to generate a different presentable frame.

In one embodiment, a device includes an input circuit to receive a stream of video data, the stream of video data including a plurality of intra-frames (I-frames) and a plurality of inter-frames; a video frame parser to separate I-frames and inter-frames from the stream of video data; a memory device having a file system thereon; a processing unit configured to: store the plurality of I-frames in an I-frame file in a contiguous memory region of the memory device; store the plurality of inter-frames in an inter-frame file of the memory device; and store an index file, the index file including information to coordinate a pre-parsed position of each I-frame of the plurality of I-frames with at least one adjacent inter-frame.

In one embodiment, a non-transitory computer-readable storage medium whose stored contents configure a computing system to perform a method includes processing a video data stream to separate intra-frames (I-frames) from inter-frames, the video data stream having an original order to the I-frames and the inter-frames; storing the I-frames in an I-frame file; storing the inter-frames in an inter-frame file; and storing, in an index file, information sufficient to restore the original order of the I-frames and the inter-frames.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are enlarged and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
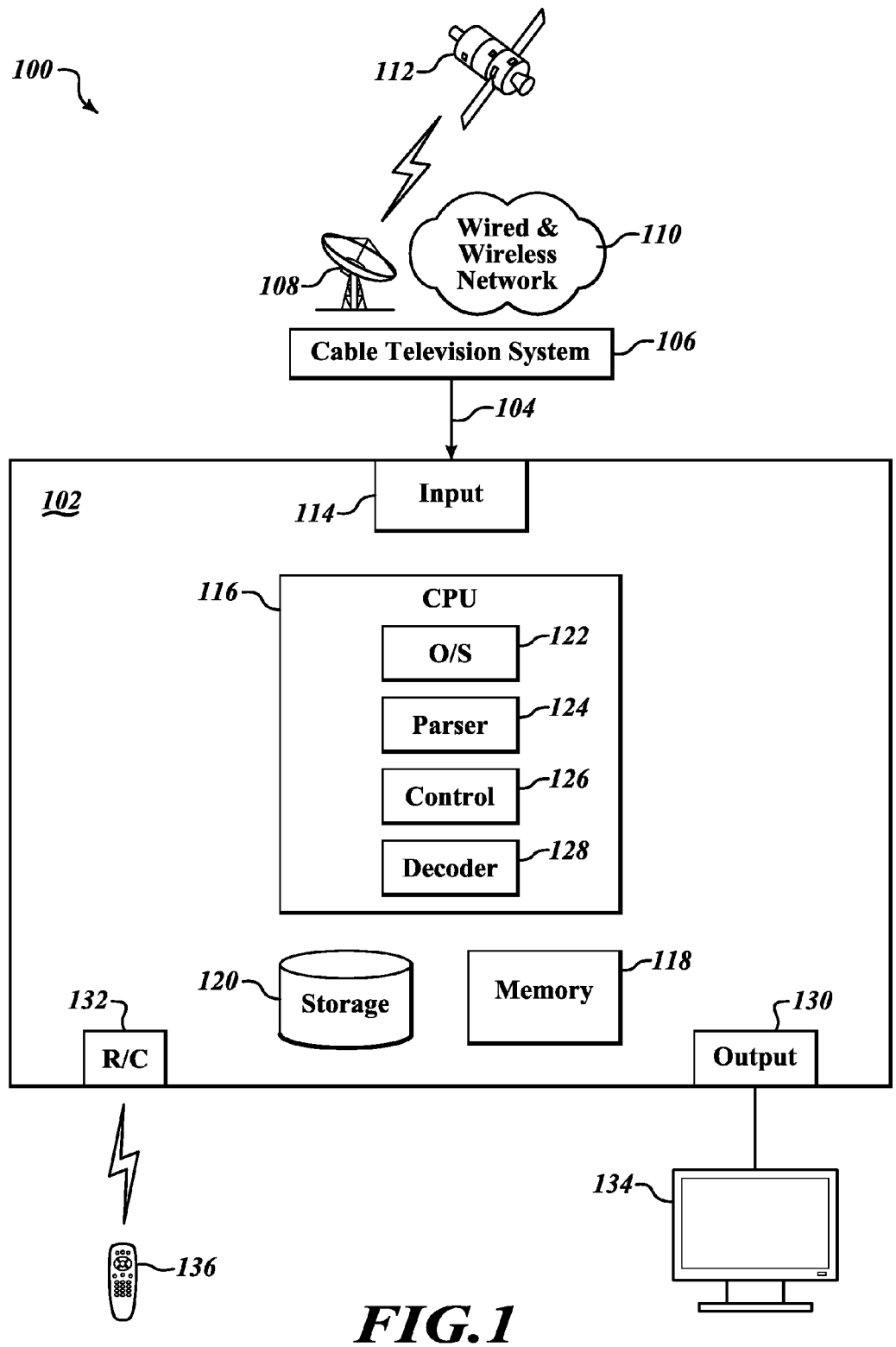
FIG. 1 illustrates a system to present multimedia content embodiment.

In an encoded video stream such as MPEG and H.264, video frames are either intra-frames (I-frames) or non-intra-frames. I-frames, which have no reference to neighboring frames, can be decoded in their entirety immediately. Non-I-frames (e.g., P-frames and B-frames) cannot be completely decoded without first decoding the neighboring frames that are referenced. Typically a video stream will contain one to three I-frames per second of video.

During high-speed forward or reverse trick play, which may be more than eight times normal playback speed, an entertainment device will decode and display only the I-frames because decoding the non-I-frames at high speed is computationally intensive. Thus, there is a desire to quickly locate I-frames within a video data stream. In some cases, an index file is created when the video data stream is received and decoded for normal speed playback, and in other cases, the index file is create when the stream is otherwise processed. The index file includes an offset and a size (e.g., in bytes) of each I-frame in the stream. If the video data stream is stored in a file, for example, a file offset stored in the index file is used to directly seek to any I-frame location in the stream.

Embodiments of entertainment devices that create index files can improve seek times when reading I-frames from a storage medium such as a disk, but further improvements can also be made. For example, in a traditional system, when a video data stream is processed, I-frame data and non-I-frame data is typically stored in the same file. Within the file, blocks of non-I-frame data stored between individual I-frames can cause access to the storage medium to be inefficient.

In a conventional entertainment system, I-frames are spaced out on the storage medium (e.g., the disk) instead of being stored in a contiguous block. Subsequently, reading a sequence of I-frames invokes a seek operation (e.g., a disk head seek) to the start of each I-frame. The time that elapses when a seek operation is performed can greatly increase the overall time taken to read the I-frame, which is inefficient. Furthermore, in a conventional system where I-frame data is not stored contiguously, the entertainment system's read-ahead caches are not fully utilized. Accordingly, the time taken to access the storage medium directly impacts the speed at which video I-frames can be decoded and output. The effects are even more prominent if the entertainment device is also being used to record programming at the same time.

Embodiments to improve storage medium performance in trick display modes create separate video files for I-frames (i.e., intra-frames) and non-I-frames (i.e., interframes). When a video data stream is processed (e.g. decoded), the stream is split and stored into at least two separate files. A first file sequentially contains the I-frame data and a second file contains non-I-frame data. A third file, an index file, is also created. The index file includes information to splice I-frame data from the first file and non-I-frame data from the second file back together to reconstruct the video data stream.

In some embodiments, the index file has three fields: a start offset of an I-frame in the first file (the I-frames-only file), a size (e.g., in bytes) of the I-frame, and a position associated with the second file (the non-I-frames file) at which the I-frame should be spliced.

Creating the first file containing I-frames but not non-I-frames improves the efficiency of access to the storage medium during I-frame trick play. In mechanical systems, for example, the movement of the disk head is reduced since extra seek operations can be avoided when moving from one I-frame to the next. Additionally, a read-ahead cache can be utilized more efficiently since sequential I-frames will occupy contiguous space in the storage medium.

In embodiments described herein, more computing resources and more processing time may elapse during normal speed play back of all frames. This is because the entertainment system will now alternately read one I-frame from the first file followed by one or more non-I-frames from the second file. Nevertheless, the use of additional resources is generally acceptable because the extra time to access multiple files does not negatively impact a user's viewing experience.

FIG. 1 illustrates a system 100 to present multimedia content. Within the system 100 of FIG. 1, an entertainment device 102 is configured for improved performance during trick play modes.

As illustrated in FIG. 1, an entertainment device 102 is configured to receive a stream of multimedia content 104. The entertainment device 102 may be interchangeably referred to as a "television converter," "receiver," "set-top box," "television receiving device," "television receiver," "television recording device," "satellite set-top box," "satellite receiver," "cable set-top box," "cable receiver," "television tuner," or the like.

The stream of multimedia content 104 is illustrated in FIG. 1 as being received via a cable television system 106 and a satellite television system 108 through a network 110. The multimedia content 104 in FIG. 1 is provided from a satellite 112 and received through an input circuit 114 (e.g., the front-end of a set top box). It is understood, however, that the multimedia content 104 may be delivered to the entertainment device 102 from many other sources and via many other means. For example, the multimedia content 104 may be delivered in an over-the-air broadcast, stored on a tangible storage medium (e.g., a digital video disc (DVD), a magnetic, optical, or solid-state hard disk, etc.) sent from a near field wireless device, delivered over the Internet, or delivered in some other way.

The stream of multimedia content 104 may include audio, video, and other data. In some embodiments, the stream of multimedia content 104 includes a stream of video data encoded according to a standardized video protocol. Standardized video protocols include ITU-T H.264, ISO/IEC MPEG video protocols such as MPEG-2 or MPEG-4, and real-time transport protocol (RTP). The multimedia content 104 includes intra-frames (e.g., I-frames) and inter-frames (e.g., B-frames, P-frames).

The entertainment device 102 of FIG. 1 includes a central processing unit (CPU) 116 configured to control operations of the entertainment device 102. The CPU 116 may include firmware and/or hardware means, including, but not limited to, one or more microprocessors, digital signal processors (DSPs), application specific integrated circuits (ASICs), standard integrated circuits, controllers (e.g., by executing appropriate instructions and including microcontrollers and/or embedded controllers), field-programmable gate arrays (FPGAs), complex programmable logic devices (CPLDs), and the like cooperatively coupled to carry out the functions of the entertainment device.

The entertainment device 102 of FIG. 1 includes a memory 118 and a storage device 120. The memory 118 and storage device 120 may be cooperatively used by the CPU 116. In particular, the memory 118 and storage device 120 may include systems, modules, or data structures stored (e.g., as software instructions or structured data) on a transitory or non-transitory computer-readable storage medium such as a magnetic, optical, or solid-state hard disk, flash drive, or other non-volatile storage device, volatile or non-volatile memory, a network storage device, or a portable media article (e.g., a DVD disk, a CD disk, an optical disk, a flash memory device, etc.) to be read by an appropriate input or output system or via an appropriate connection.

In the embodiment of FIG. 1, the memory 118 and storage device 120 are illustrated as separate and distinct memory means. In other embodiments, the memory 118 and storage device 120 may be combined in a single memory device. Embodiments of the entertainment device 102 may be configured with a memory 118 having software instructions stored thereon to implement particular features of the entertainment device. For example, within the entertainment device, the CPU 116 may be configured to retrieve and execute software instructions stored on a non-transitory computer readable storage medium such as memory 118. The CPU 116, memory 118, and optionally other electronic circuits of the entertainment device 102 may work cooperatively to implement the functions of an operating system module 122, the video data stream frame parser module 124, a control module 126, and a video frame decoder module 128.

The entertainment device 102 of FIG. 1 includes a user input control 136, which is configured to provide input to the entertainment device 102 through a user input control circuit 132. The user input control 136 may be a conventional remote control device or some other wired or wireless input device. Accordingly, a user may direct the entertainment device 102 to play real-time multimedia content from one or many channels. The user may further direct the entertainment device 102 to record multimedia content, fast-forward and reverse play the content, and otherwise control the storage and delivery of multimedia content.

The entertainment device 102 of FIG. 1 includes an output circuit 130 configured to direct multimedia content output to a presentation device 134 such as a display. Generally speaking, the output circuit 130 is configured to output data to the presentation device 134 in the form of a sequence of presentable video frames.

In one embodiment of the system 100 illustrated in FIG. 1, televised programming content 104 is delivered from a satellite 112 through a network 110. The televised programming content 104 is received by an entertainment device 102 through an input circuit 114. In the embodiment, the programming content 104 is encoded according to an MPEG standard.

A user of the entertainment device 102 views the programming content 104 on a presentation device 134. The CPU 116 runs an operating system 122, which directs various program modules to carry out the functions of the entertainment device 102 as directed by the user. In this case, a parser module 124 is configured to parse a video data stream of the programming content 104 to extract constituent frames. The constituent frames are decoded to form a sequence of presentable video frames that are output to the presentation device 134. Additionally, the constituent frames are stored on the memory storage device 120.

At some point during the time the user is viewing the programming content 104, the user wants to see a portion of the programming content 104 again. Through the user input device 136, the user directs a reverse playback mode. In some cases the reverse playback frame rate is fixed, and other embodiments the reverse playback frame rate can be selected by the user. Some typical reverse playback frame rates are two times, four times, eight times, or sixteen times a normal forward playback frame rate, but other frame rates may also be selected.

In response to the user request, the CPU 116 will then operate to retrieve a portion of the video data stream of programming content 104 from the memory storage device 120. The constituent frames that are retrieved from the memory storage device 120 are decoded and played back in reverse at the selected speed. Concurrently, the entertainment device will continue to receive, process (i.e., decode), and store additional programming content 104 to the memory storage device 120. Later, the user may return to normal speed playback, fast-forward, reverse play again, or perform other actions.

Figure 2:
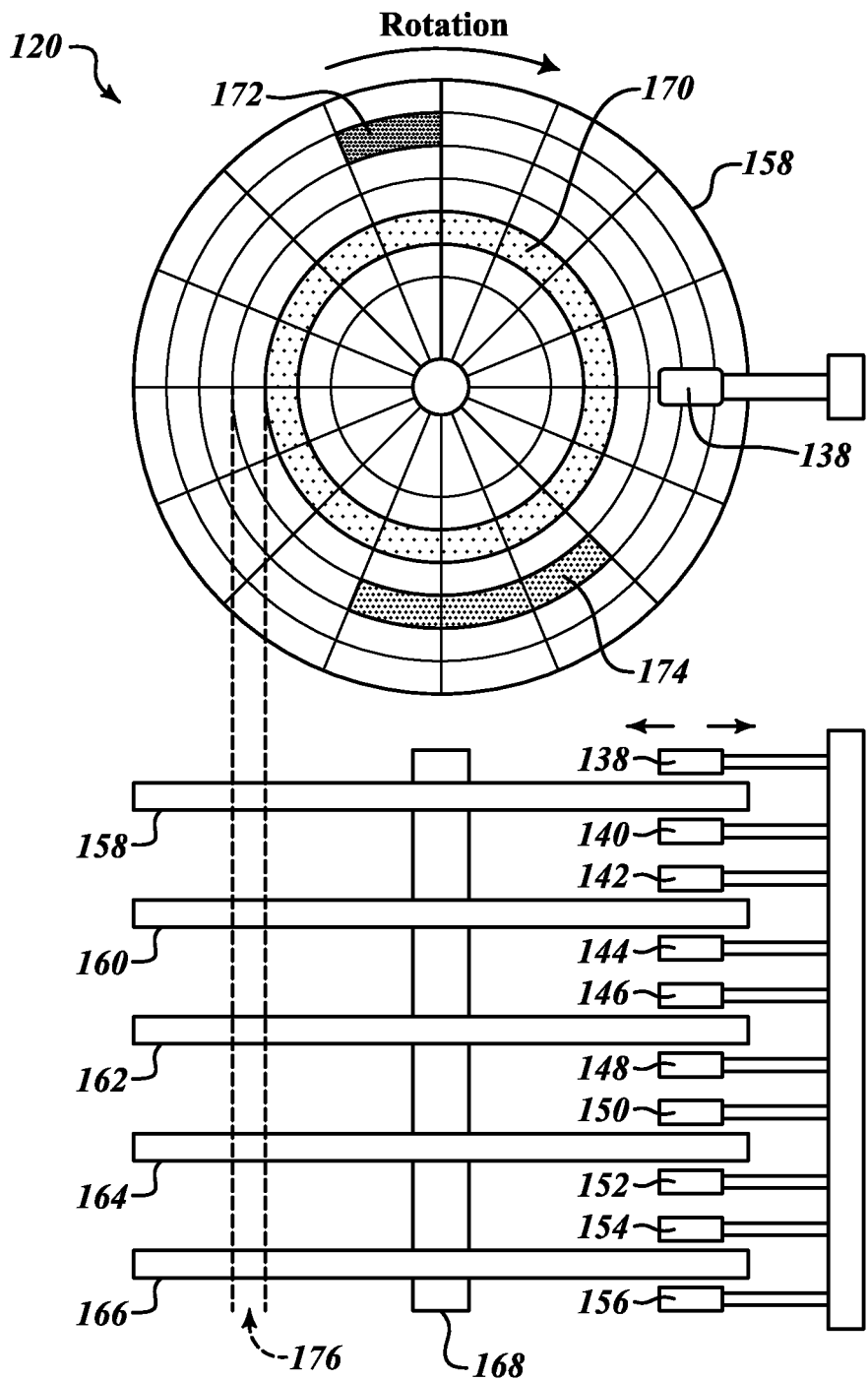
FIG. 2 illustrates an embodiment of a memory storage device in more detail.

An embodiment of the memory storage device 120 is illustrated in more detail in FIG. 2. The memory storage device illustrated is a magnetic hard disk, however, other memory storage technologies such as optical or phase change memories may be similarly constituted.

In the memory storage device 120 of FIG. 2, a read/write (r/w) head 138 is illustrated in top and side views. The r/w head 138 is situated above a platter 158 having the memory recording media thereon. The r/w head 138 may be directed to operate laterally or in other directions as the platter 158 rotates below. The combination of the rotating platter 158 and movable r/w head 138 permits the r/w head 138 to access any sector of the top surface of the platter 158 to read and write data.

As illustrated in the side view of FIG. 2, the exemplary memory storage device embodiment 120 includes five platters 158-166, each having upper and lower r/w surfaces. The platters are mounted on a spindle 168, which is controllable to rotate the platters. The exemplary memory storage device embodiment 120 includes ten r/w heads 138-156, which are controllable to access each sector on the respective surface of the respective platter. Accordingly, each sector of the memory storage device 120 can be read and written.

As illustrated in the top of FIG. 2, the surface of each platter is configured having tracks 170, sectors 172, and clusters 174.

As a r/w head moves in towards the spindle 168 or out towards the edge, the r/w head will stop above a particular sector. A sector is generally the smallest physical storage unit on the memory storage device. Typically, a sector is 512 bytes in size. From its position above a particular sector, the r/w head is able to access an entire track of data as the platter rotates. Thus, a block of data that is smaller than a sector can be written in a single sector, and a block of data that is larger than a sector can be written in a cluster of sectors.

With reference to FIG. 1, the operating system module 122 is configured to administer a file system. The CPU 116 is configured to read and write data to the memory storage device 120 through the file system. Typically, a file stored on the memory storage device 120 will occupy one or more clusters. However, as the data is stored, it may become scattered across many sectors, clusters, and tracks. Then, when the data is retrieved, the r/w head must seek the particular track having the sector where the data resides, and the spindle must rotate to place the correct track in proximity to the r/w head.

As shown in FIG. 2, one piece of data is stored in sector 172, and a second piece of data is stored in a sector of cluster 174. In order to read both pieces of data, the r/w head 138 and spindle 168 must operate to first seek sector 172, and later seek the appropriate sector of cluster 174. Performing seek operations consumes time and programming resources. Alternatively, if both pieces of data were stored in sectors of cluster 174, then both pieces of data could be retrieved in cooperation with a single seek operation.

As data is read from the memory storage device 120, certain efficiencies are typically implemented. For example, one efficiency includes a read-ahead cache, which may be implemented in memory 118 (FIG. 1). It is recognized that when a small amount of data is read from a memory storage device at a first point in time, additional data will often be requested at a next point in time. For this reason, when a user reads the memory storage device 120 to retrieve a piece of data, the memory storage device 120 will also return additional data that is stored in close proximity to the requested data. The additional data is stored in a read-ahead cache. Subsequently, if the additional data is requested, it is retrieved from the read-ahead cache, which is a faster operation, instead of being retrieved from the memory storage device, which is a slower operation. Accordingly, it is recognized that if some data will be retrieved at a first time and additional data will be retrieved soon after at a second time, then writing both pieces of data in a single cluster will provide for more efficient retrieval. This is because the first data can be retrieved from the memory storage device 120 and the second data can later be retrieved from the read-ahead cache in memory 118.

The memory storage device 120 of FIG. 2 is illustrated in a very simplistic form. In other embodiments, the storage device will have more or fewer than five platters, and the storage device will typically have hundreds or thousands of tracks 170 and sectors 172.

Figure 3:
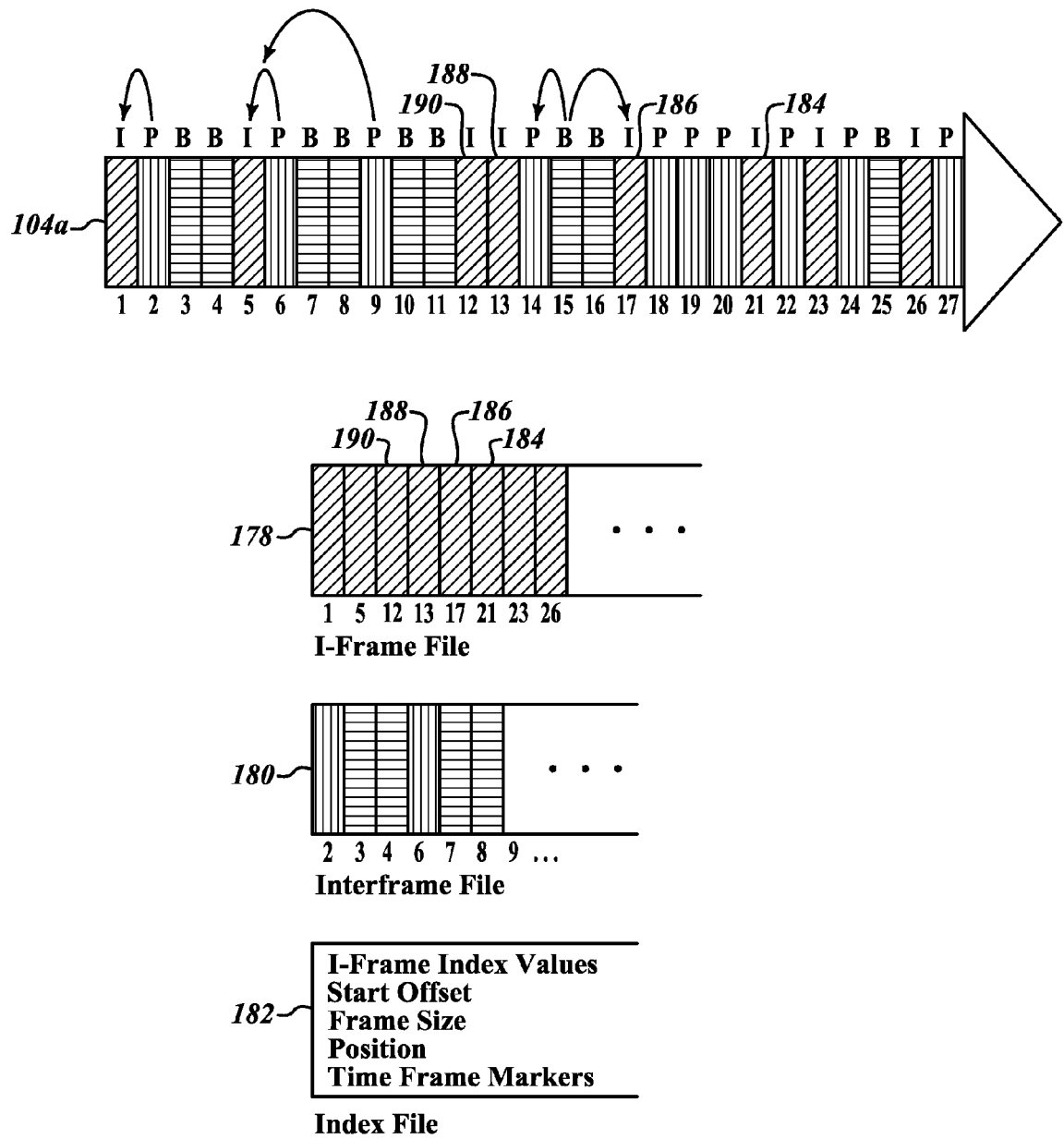
FIG. 3 illustrates a representation of a video data stream and three files used to store video data in an embodiment.

FIG. 3 illustrates a representation of a stream of video data and three files used to store video data in an embodiment. The stream of video data 104a illustrated in FIG. 3 may be all or part of the stream of multimedia content 104 (FIG. 1). The stream of video data includes a plurality of I-frames, P-frames, and B-frames. The I-frames may be designated as intra-frames. The P-frames and B-frames may be designated as inter-frames.

A video frame parser 124 analyzes the stream of video data 104a and separates the I-frames and the inter-frames from the stream 104a. A processing unit such as CPU 116 is configured to store a sequence of I-frames in an I-frame file 178. The I-frame file 178 is stored on a memory device such as memory storage device 120 (FIG. 2), which has a file system thereon administered by an operating system module 122. Preferably, some or all of the I-frames of the I-frame file 178 are stored in a contiguous memory region (e.g., the same cluster or track) of the memory storage device 120.

As illustrated in FIG. 3, the I-frame file 178 stores the I-frames in sequence. Storing the I-frames in sequence facilitates storage of the I-frames in a contiguous memory region. Each constituent frame of the video data stream 104a is shown having a particular frame index number 1-27, and the frame index numbers are carried through and shown with I-frame file 178, however different mechanisms to identify the particular sequences may be used. It is shown in FIG. 3 that I-frame 190, I-frame 188, I-frame 186, and I-frame 184 occur in order, and the order of the frames is maintained in I-frame file 178.

The processing unit 116 is further configured to store the plurality of inter-frames in an inter-frame file 180. The inter-frames, which may be P-frames or B-frames, each include a reference to at least one I-frame. A simplified set of relationships is shown in the video data stream 104a as arcing lines between inter-frames and intra-frames.

The processing unit 116 is also configured to store an index file 182. The index file 182 includes information to coordinate a pre-parsed position of each I-frame of the plurality of I-frames with at least one adjacent inter-frame. The coordination information may include particular index values such as the sequence of integer numbers illustrated in FIG. 3. For example, in the stream of video data 104a, I-frame 186 is adjacent to a B-frame and a P-frame. That is, I-frame 186 is located at index 17, adjacent to the B-frame at index 16 and P-frame at index 18. If the index values are stored in the index file, the video data stream 104a can be reconstituted using information from the index file to reorder frames of the I-frame file in the inter-frame file Additional information may also be stored in the index file. For example, in some cases the video data stream 104a includes associated time markers. The time markers, which are shown as an alternate use of the integer sequence 1-27 of FIG. 3, may represent actual second counters, offsets from a known point in the video data stream, or some other marker. In such cases, the processing unit may be configured to store in the index file the actual time markers or other representative timing data. In one case, a start offset of each I-frame of the sequence of I-frames is stored. The start offset is relative to the position in the video data stream of the particular I-frame. A size (e.g., in bytes) of each I-frame stored, and a position of each I-frame relative to neighboring constituent frames of the video data stream is also stored.

Figure 4:
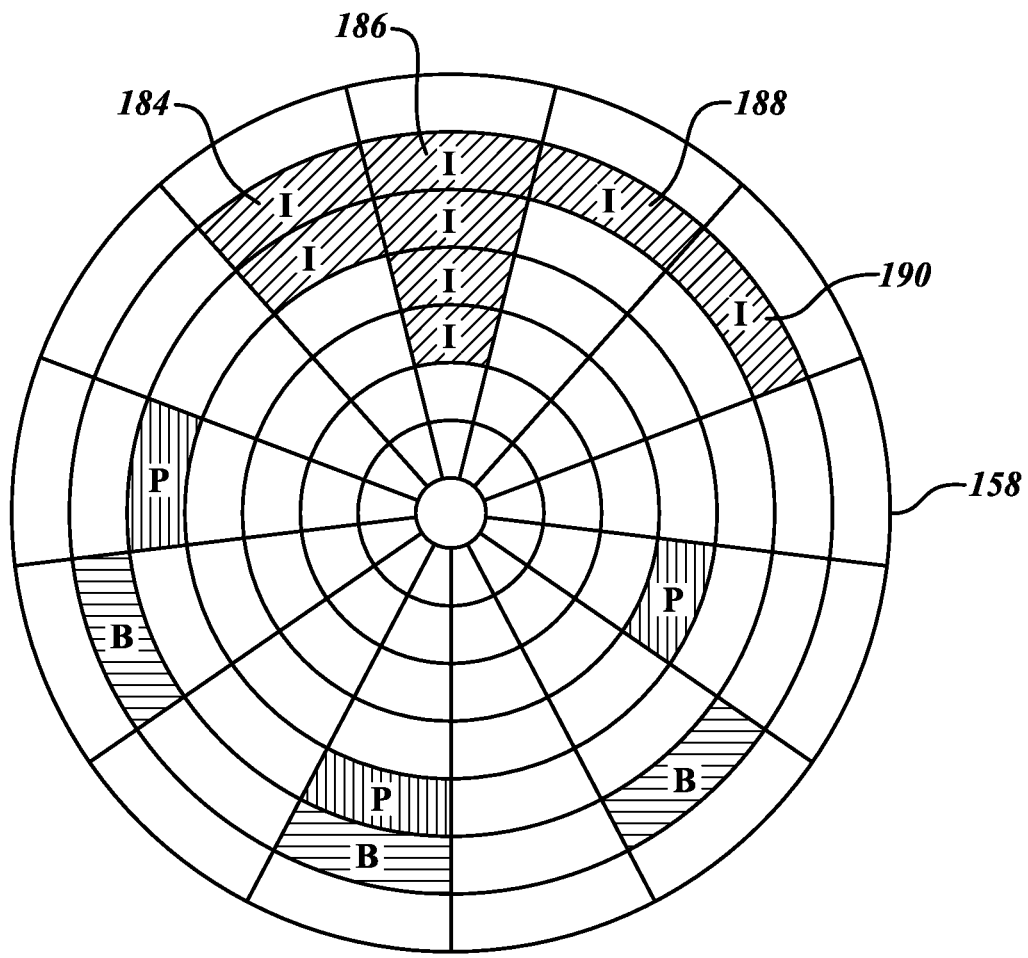
FIG. 4 illustrates an embodiment of a memory storage medium configured to store the video data stream of FIG. 3.

FIG. 4 illustrates an embodiment of a memory storage device 120 configured to store the video data stream 104a of FIG. 3. As illustrated in FIG. 4, the platter 158 of memory storage device 120 is configured having sectors, tracks, and clusters. The memory storage device 120 has a file system administered by an operating system, which is used to effect the storage of the I-frame file 178, the inter-frame file 180, and the index file 182. As shown, I-frame 190, I-frame 188, I-frame 186, and I-frame 184 are stored in a single cluster of a single track on platter 158. Other I-frames are shown stored in the same general area of the memory storage device 120. When I-frames of an I-frame file 178 are stored in such a manner, the I-frames can be retrieved more efficiently due to a reduced number of seek operations and an increased use of the data stored in a read-ahead cache. Thus, it is also recognized that other mechanisms of physical storage on a memory device may also be employed. For example, the I-frames may be stored on different platters within a cylinder of a disk-based system, or the I-frames may be stored in the same or adjacent rows of a solid-state memory. In such systems, a reduced number of seek operations and an increased use of read-ahead cache may be achieved.

Figure 5:
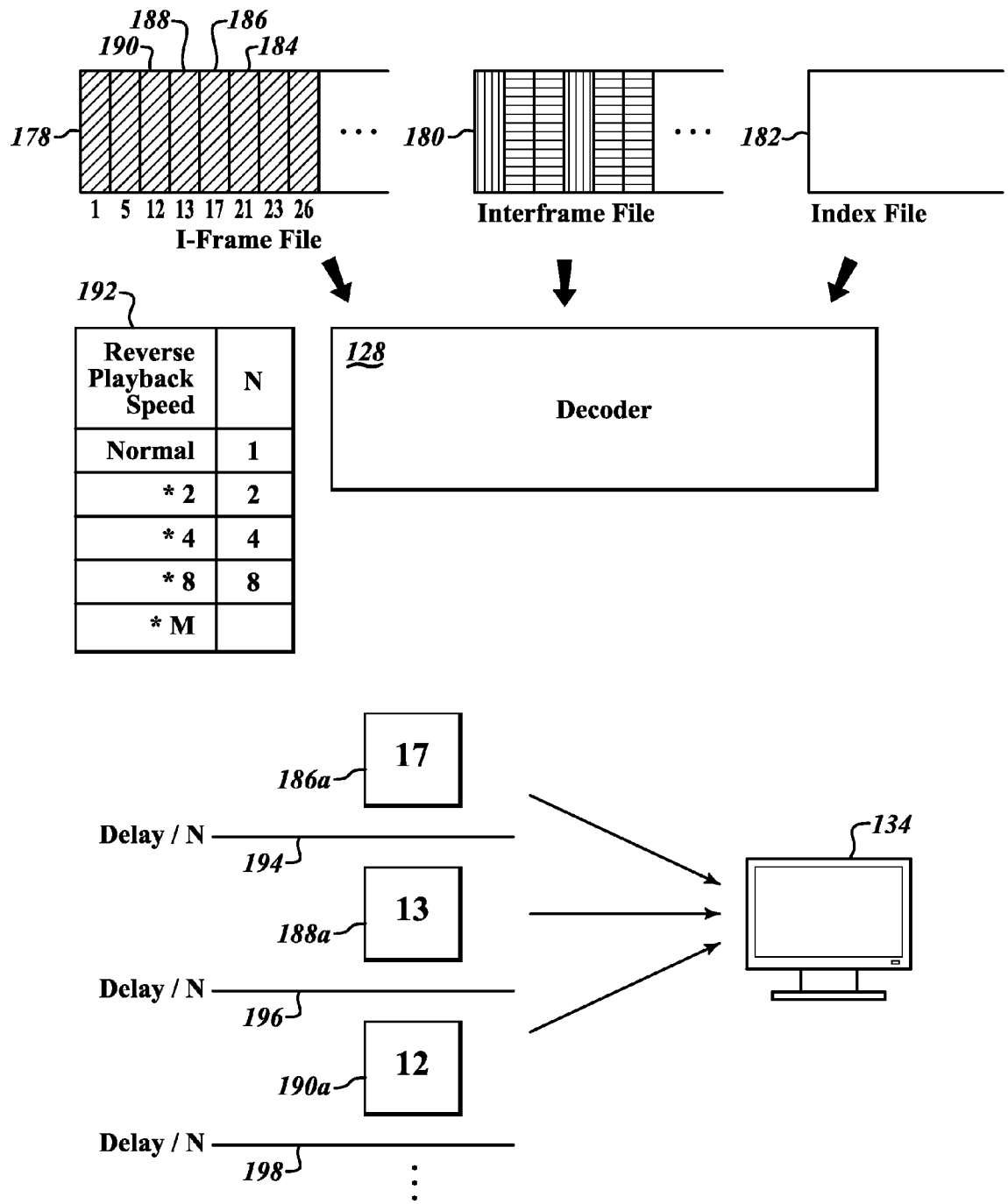
FIG. 5 illustrates an embodiment of decoding constituent frames from a file, decoding the frames into a sequence of presentable video frames, and outputting each presentable video frame to a display device.

FIG. 5 illustrates an embodiment decoding constituent frames from a file, decoding the frames into a sequence of presentable video frames, and outputting each presentable video frame to a display device. In an embodiment, index values are retrieved from the index file 182. The index values are used to retrieve frames from the inter-frame file 180 and the I-frame file 178. A decoder module 128 decodes the retrieved frames and generates presentable video frames that are passed to display 134.

In another embodiment, a user directs an entertainment device to play a portion of a video data stream 104a (FIG. 3) in reverse. The embodiment includes a reverse frame rate table 192 having multiple entries. The entries may be hard-coded (e.g., fixed), or the entries may be selected by a user. The reverse frame rate table 192 is configured to store values that direct the entertainment device to play back video in reverse at a particular speed. The table 192 of FIG. 5 includes a normal, real-time playback speed and entries for double, quad, and eight times normal playback speed. The table 192 also includes another entry M, which may be a user config-urable entry or an indication to play back decoded frames as quickly as possible. Different embodiments will have different configuration values.

In the embodiment, the command to begin reverse play-back causes the processing unit 116 (FIG. 1) to direct operations of the decoder 128. Values from the index file are used to retrieve I-frames from I-frame file 178. The I-frames are retrieved in such an order as they will be played back in reverse order. As illustrated, I-frame 186 will be retrieved before I-frame 188, and I-frame 188 will be retrieved before I-frame 190. The decoder 128 will decode the respective I-frames and generate presentable video frames 186a, 188a, and 190a. A presentable video frame 186a is output to the presentation device 134, and a first delay 194 is executed. The first delay 194 is determined based on a value from the reverse frame rate table 192. Subsequently, presentable video frames 188a, 190a, and others are output to the presentation device 134 separated by corresponding delays 196, 198, and others.

Figure 6:
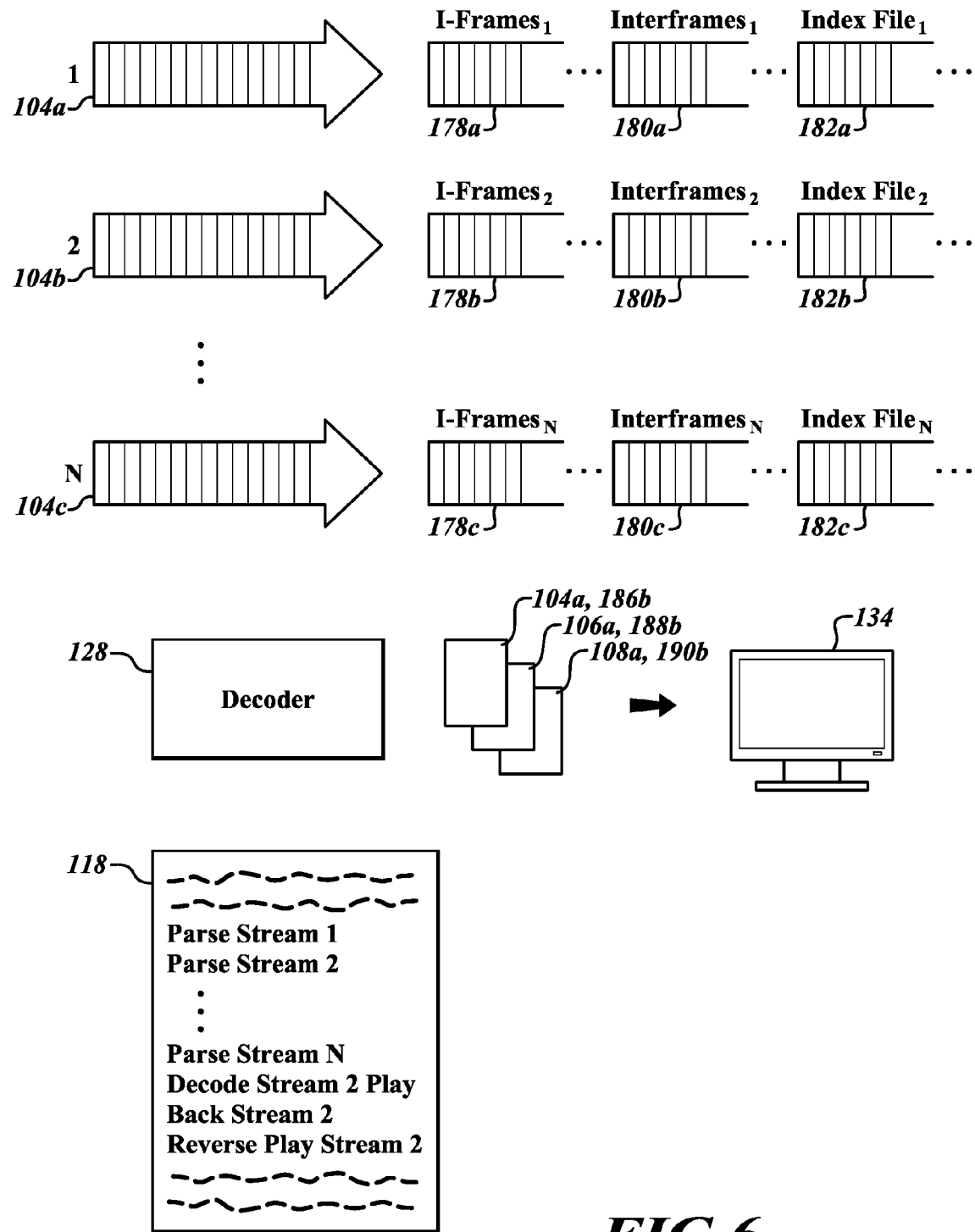
FIG. 6 illustrates yet another embodiment of a system to present multimedia content.

FIG. 6 illustrates yet another embodiment of a system to present multimedia content. In the embodiment, multiple video data streams are parsed and stored. Three video data streams 104a, 104b, 104c are illustrated, but many more video data streams can also be processed concurrently. Memory 118 (FIG. 1) includes a set of software instructions to direct a processing unit 116 (FIG. 1) to parse the multiple streams of video data, decode at least one stream, and play back the decoded stream. Trick mode instructions are also included to direct operations such as fast-forward play and reverse play at a particular speed.

In FIG. 6 the first, second, and third video data streams 104a, 104b, 104c are parsed into constituent frames. The I-frames are stored in respective I-frames files 178a, 178b, 178c. The inter-frames are stored in respective inter-frame files 180a, 180b, 180c. Index information is stored in respective index files 182a, 182b, 182c. A user directs the entertainment device to decode and play video data stream 104b. At some point, the user directs the entertainment device to play back a portion of the video data stream 104b in reverse. The index file 182b is used to retrieve I-frames from the I-frame file 178b, and the decoder 128 generates presentable video frames 186b, 188b, 190b, which are output to the presentation device 134.

In the foregoing description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic and computing systems including client and server computing systems, as well as networks have not been shown or described in detail to avoid unnecessarily obscuring descriptions of the embodiments.

Unless the context requires otherwise, throughout the specification and claims which follow, the word "comprise" and variations thereof, such as, "comprises" and "compris-ing" are to be construed in an open, inclusive sense, e.g., "including, but not limited to."

Reference throughout this specification to "one embodi-ment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates other-wise.

The headings and Abstract of the Disclosure provided herein are for convenience only and do not interpret the scope or meaning of the embodiments.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method to play a video data stream, comprising:
   parsing the video data stream to extract constituent intra-frames (I-frames) and inter-frames;
   storing a sequence of I-frames in an I-frame file, each I-frame of the sequence including information to generate a corresponding presentable video frame;
   storing a set of inter-frames in an inter-frame file, each inter-frame of the set including a reference to at least one I-frame and information to generate a different presentable frame;
   storing a set of index values in an index file, the index values configured to identify relationships between I-frames of the I-frame file and inter-frames of the inter-frame file;

receiving a user command to play a portion of the video data stream in reverse;
retrieving I-frame index values from the index file;
applying respective I-frame index values to retrieve corresponding I-frames from the I-frame file;
retrieving inter-frame index values from the index file;
using respective inter-frame index values to retrieve corresponding inter-frames from the inter-frame file;
decoding the corresponding inter-frames; and
forming a presentable video frame from each of the decoded corresponding inter-frames and at least one associated I-frame.

2. The method of claim 1 wherein the set of inter-frames includes at least one bi-directionally predictive frame (B-frame) and at least one predictive frame (P-frame).

3. The method of claim 1 wherein the video data stream is encoded according to an ITU-T H.264 or ISO/IEC MPEG-4 video protocol.

4. The method of claim 1 wherein the respective storing acts include writing data to a solid-state disk drive.

5. The method of claim 1 wherein storing the sequence of I-frames includes writing the sequence of I-frames to a contiguous area of memory.

6. The method of claim 1 wherein receiving a user command includes receiving a user configurable reverse playback frame rate.

7. The method of claim 1, comprising:
delaying a determined amount of time between playback of at least two presentable video frames, the determined amount of time based on a user selectable reverse playback speed; and
outputting each presentable video frame to a display device.

8. The method of claim 1 wherein the user command directs the portion of the video data stream to be played in reverse at a real-time rate.

9. The method of claim 1, comprising:
parsing a second video data stream into constituent I-frames and inter-frames;
storing a second sequence of I-frames in a second I-frame file, each I-frame of the second sequence including information to generate a corresponding presentable video frame;
storing a second set of inter-frames in a second inter-frame file, each inter-frame of the second set including a reference to at least one I-frame of the second sequence of I-frames;
storing a second set of index values in a second index file, the index values configured to identify relationships between I-frames of the second I-frame file and inter-frames of the second inter-frame file;
receiving a second user command to play a portion of the second video data stream in reverse;
retrieving I-frame index values from the index file; and
using I-frame respective index values to retrieve corresponding I-frames from the I-frame file.

10. The method of claim 1, wherein storing the set of index values includes:
storing a start offset of each I-frame of the sequence relative to the position in the video data stream of each respective I-frame;
storing the size in bytes of each I-frame of the sequence; and
storing the position of each I-frame of the sequence relative to neighboring constituent frames of the video data stream.

11. The method of claim 1, comprising:
reconstituting the video data stream using information from the index file to reorder frames of the I-frame file and inter-frame file.

12. A device, comprising:
an input circuit to receive a stream of video data, the stream of video data including a plurality of intra-frames (I-frames) and a plurality of inter-frames;
a video frame parser to separate I-frames and inter-frames from the stream of video data;
a memory device having a file system thereon;
a processing unit configured to:
store the plurality of I-frames in an I-frame file in a contiguous memory region of the memory device;
store the plurality of inter-frames in an inter-frame file of the memory device;
store an index file, the index file including information to coordinate a pre-parsed position of each I-frame of the plurality of I-frames with at least one adjacent inter-frame;
receive a user command to play a portion of the video data stream in reverse;
retrieve I-frame index values from the index file;
apply respective I-frame index values to retrieve corresponding I-frames from the I-frame file;
retrieve inter-frame index values from the index file;
use respective inter-frame index values to retrieve corresponding inter-frames from the inter-frame file;
decode the corresponding inter-frames; and
form a presentable video frame from each of the decoded corresponding inter-frames and at least one associated I-frame.

13. The device of claim 12 wherein the input circuit includes a front-end of a set top box.

14. The device of claim 12 wherein the plurality of inter-frames includes at least one bi-directionally predictive frame (B-frame) and at least one predictive frame (P-frame).

15. The device of claim 12 wherein the stream of video data is encoded according to a standardized video protocol.

16. The device of claim 12 wherein the disk drive is a magnetic disk drive.

17. The device of claim 12, comprising:
a user-control input circuit to receive a user command to play a portion of the stream of video data in reverse, wherein the processing unit, based on the user command, is configured to:
retrieve a sequential set of I-frames from the contiguous memory region of the memory device; and
decode the sequential set of I-frames for presentation to a display device.

18. A non-transitory computer-readable storage medium whose stored contents configure a computing system to perform a method, the method comprising:
processing a video data stream to separate intra-frames (I-frames) from inter-frames, the video data stream having an original order to the I-frames and the inter-frames;
storing the I-frames in an I-frame file;
storing the inter-frames in an inter-frame file;
storing, in an index file, information sufficient to restore the original order of the I-frames and the inter-frames;
receiving a user command to play a portion of the video data stream in reverse;
retrieving I-frame index values from the index file;
applying respective I-frame index values to retrieve corresponding I-frames from the I-frame file;
retrieving inter-frame index values from the index file;

using respective inter-frame index values to retrieve corresponding inter-frames from the inter-frame file;

decoding the corresponding inter-frames; and forming a presentable video frame from each of the decoded corresponding inter-frames and at least one associated I-frame.

19. The non-transitory computer-readable storage medium according to claim 18 wherein storing the I-frames in an I-frame file includes writing the I-frames in a contiguous area of memory.

20. The non-transitory computer-readable storage medium according to claim 18 whose stored contents configure the computing system to perform the method, the method further comprising:

decoding the I-frames according to an MPEG decoding algorithm; and outputting the decoded I-frames to a presentation device.

21. The non-transitory computer-readable storage medium according to claim 20 wherein outputting the decoded I-frames includes outputting the decoded I-frames in reverse order.

22. The non-transitory computer-readable storage medium according to claim 18 whose stored contents configure the computing system to perform the method, the method further comprising:

retrieving at least some of the information from the index file;

using the at least some of the information to retrieve I-frames from the I-frame file and inter-frames from the inter-frame file;

decoding the I-frames;

decoding the inter-frames; and outputting the decoded I-frames and inter-frames in the original order to a presentation device.

23. The non-transitory computer-readable storage medium according to claim 22 wherein outputting the decoded I-frames includes outputting the decoded I-frames in reverse order at a user-configurable rate.

* * * * *